(12) United States Patent
Kalavade et al.

(10) Patent No.: US 9,426,049 B1
(45) Date of Patent: Aug. 23, 2016

(54) DOMAIN NAME RESOLUTION

(71) Applicant: Zettics, Inc., Concord, MA (US)

(72) Inventors: Asawaree Prabhakar Kalavade, Acton, MA (US); John James Thomas, Acton, MA (US); Lawrence Arlen Palmer, Harvard, MA (US); Shasidhar Kura, Shrewsbury, MA (US); Prasath Reddy Palnati, Westford, MA (US)

(73) Assignee: Zettics, Inc., Concord, MA (US)

( * ) Notice: Subject to any disclaimer, the term of this patent is extended or adjusted under 35 U.S.C. 154(b) by 330 days.

(21) Appl. No.: 14/148,528

(22) Filed: Jan. 6, 2014

Related U.S. Application Data

(60) Provisional application No. 61/749,716, filed on Jan. 7, 2013.

(51) Int. Cl.
*G06F 15/173* (2006.01)
*H04L 12/26* (2006.01)

(52) U.S. Cl.
CPC .................................. *H04L 43/0876* (2013.01)

(58) Field of Classification Search
CPC ... H04L 67/2814; H04L 67/34; H04L 12/585; H04L 61/1511; G06F 17/30864
See application file for complete search history.

(56) References Cited

U.S. PATENT DOCUMENTS

| | | | | |
|---|---|---|---|---|
| 2004/0039798 A1* | 2/2004 | Hotz | ................... | H04L 61/1511 709/219 |
| 2006/0106866 A1* | 5/2006 | Green | ............... | G06F 17/30864 709/224 |
| 2006/0200487 A1* | 9/2006 | Adelman | ............. | G06Q 10/107 |
| 2008/0022013 A1* | 1/2008 | Adelman | ............. | H04L 12/585 709/245 |
| 2008/0091767 A1* | 4/2008 | Afergan | .................. | H04L 67/34 709/202 |
| 2009/0182898 A1* | 7/2009 | Adelman | ............. | G06Q 10/107 709/245 |
| 2012/0173677 A1* | 7/2012 | Richardson | ........... | H04L 67/327 709/219 |
| 2012/0324113 A1* | 12/2012 | Prince | ................. | H04L 67/2814 709/226 |

* cited by examiner

*Primary Examiner* — Nicholas Taylor
*Assistant Examiner* — Afroza Sultana
(74) *Attorney, Agent, or Firm* — Nields, Lemack & Frame, LLC

(57) ABSTRACT

A method for inferring a domain for an IP address, the method including receiving a computerized flow record from a communication service provider including the IP address, wherein the IP address corresponds to a request from a subscriber for an Internet resource, performing an in-stream lookup including: determining whether any SSL exchanges result from the request for the Internet resource, when the SSL exchanges exist, attempting to retrieve domain information corresponding to the IP address from the SSL exchanges, determining whether any DNS records exist that include the IP address, and when the DNS records exist that include the IP address, attempting to retrieve the domain information corresponding to the IP address from the DNS records, performing contextual mapping including: performing a whois query using the IP address in an attempt to identify the domain information corresponding to the IP address, performing a reverse DNS lookup in an attempt to identify the domain information corresponding to the IP address, attempting to establish an SSL connection to the IP address to identify the domain information, and querying clickstream information from the content service provider in an attempt to identify the domain information.

10 Claims, 5 Drawing Sheets

DOMAIN NAME RESOLUTION

CROSS-REFERENCE TO RELATED APPLICATIONS

This application claims priority to U.S. Provisional Patent Application No. 61/749,716, filed Jan. 7, 2013, entitled "DOMAIN NAME RESOLUTION FOR FLOW RECORDS STARTING WITH IP ADDRESS", the contents of which is incorporated herein in its entirety.

BACKGROUND

Tracking of users' activity on websites and/or other internet locations can be useful to provide targeted advertisement and/or content to the user. Traditionally, the tracking of users' activity can be accomplished because the domain names associated with the transactions are known. HTTP is an example of one protocol used to complete transactions where the domain name is known. For HTTP transactions, the Domain names can be determined by analyzing parts of the URL fields. HTTPS (using SSL) is an example of a protocol that is used to complete transactions, which is more secure than HTTP, but where the domain name is unknown. For HTTPS (or SSL), there is often no information about the URL. Without information about the URL, traditional methods cannot be employed to track users' activities.

SUMMARY

In general, in an aspect, embodiments of the disclosed subject matter can provide a computerized method for inferring a domain for an IP address, the method performed using at least one processor, the method including receiving, by the at least one processor, a computerized flow record from a communication service provider including the IP address, wherein the IP address corresponds to a request from a subscriber for an Internet resource, performing, by the at least one processor, an in-stream lookup including: determining, by the at least one processor, whether any secure socket layer ("SSL") exchanges result from the request for the Internet resource, when the SSL exchanges exist, attempting to retrieve domain information corresponding to the IP address from the SSL exchanges, determining, by the at least one processor, whether any domain name system ("DNS") records exist that include the IP address, and when the DNS records exist that include the IP address, attempting to retrieve the domain information corresponding to the IP address from the DNS records; performing, by the at least one processor, contextual mapping including: performing a whois query using the IP address in an attempt to identify the domain information corresponding to the IP address, performing a reverse DNS lookup in an attempt to identify the domain information corresponding to the IP address, attempting to establish an SSL connection to the IP address to identify the domain information, and querying clickstream information from the content service provider in an attempt to identify the domain information.

Embodiments of the disclosed subject matter can also provide one or more of the following feature. The Internet resource is a webpage. Performing contextual mapping further includes analyzing a user transaction history in an attempt to identify the domain information. The user transaction history includes at least one of a historical record of all domains associated with the IP address, regardless of the user that requested the IP address, and a historical record of all domains associated with the IP address in response to a request for the IP address from the subscriber. Querying the clickstream information further includes querying a database of clickstream information. The method further comprises building the database of clickstream information by analyzing deep packet inspection ("DPI") logs and domain name system ("DNS") lookup records. The method further includes performing, by the at least one processor when the domain information was successfully retrieved, associative mapping including determining, by the at least one processor, whether the domain information corresponds to a user-perceived domain, and when the domain information is not a user-perceived domain, determining a corresponding domain that is a user-perceived domain. The method further includes performing, by the at least one processor, a learning process to populate a database used while performing contextual mapping, the learning process comprising at least one of performing deep packet inspection to obtain DNS queries and response logs, capturing network traffic within a network to trace domain resolutions within the network, attempting to access a webpage associated with the IP address, and analyzing clickstream data. The method further includes updating the database, the updating including using DNS queries and response logs obtained during the contextual mapping process to update the database, using domain resolutions traced during the contextual mapping process to update the database, using web pages accessed during the contextual mapping process to update the database, and using clickstream data analyzed during the contextual mapping process to update the database. The method further includes generating an enriched record including the IP address and the domain information. The method further includes determining an application that the subscriber used to request the Internet resource.

Various aspects of the disclosed subject matter can provide one or more of the following capabilities. Domain names in transactions can be inferred from IP addresses, port numbers, and/or transaction metrics. This type of information is typically available in flow records but is also available from other sources as well. Subscriber and website activity can be determined more easily than with prior techniques. Communication service providers can receive subscriber activity information that would otherwise be unavailable. Subscribers' data usage can be tracked when a requested domain name is unknown. Subscriber, website or device usage information across HTTP and non-HTTP protocols can be determined. Type of content accessed such as video or browsing can be determined for all protocols. Usage to user-visited sites vs. background sites can be differentiated and combined if required.

These and other capabilities of the disclosed subject matter will be more fully understood after a review of the following figures, detailed description, and claims.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

Figure 1:
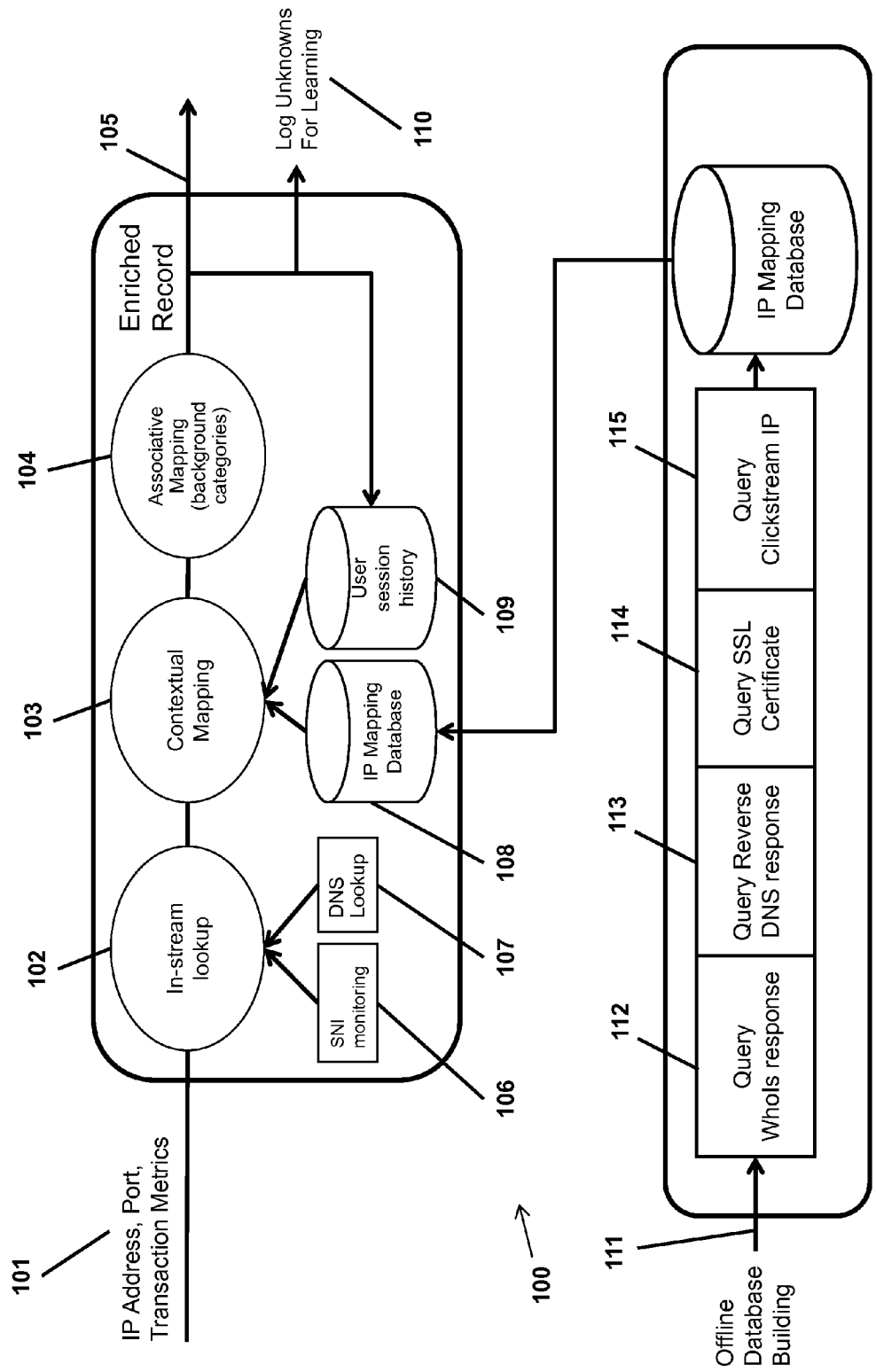
FIG. 1 illustrates an exemplary process of inferring a requested domain.

Embodiments of the disclosed subject matter can provide techniques for determining and/or tracking content and/or domains accessed by a subscriber based on flow records provided by a communication service provider (CSP). CSPs are typically service providers that electronically transmit information such mobile carriers, Internet Service Providers (ISPs), cable providers, Machine to Machine (M2M) providers, etc. Typically, CSPs generate flow records corresponding to subscriber sessions that include a subscriber IP address, an IP address requested by the subscriber, and metrics about the transaction (e.g., the amount of data sent to the CSP, and the amount of data returned to the subscriber). While this information can be useful, it can lack content-level information that can be useful to CSPs (e.g., CSPs can benefit from knowing what type of content subscribers are accessing). Using the flow records, the techniques described herein can infer a likely site, address, domain, and/or content accessed by the subscriber in any given request. After inferring the likely site address, domain, and/or content accessed by the subscriber, the system described herein can generate an enriched record including the inferred information. Other embodiments are within the scope of the disclosed subject matter.

An exemplary scenario that can benefit from the techniques described herein is the following. Subscribers often pay for the amount of data that they consume (for example, data plans with mobile carriers). In situations where the subscriber receives an unexpectedly large bill, the subscriber often calls the CSP to request an explanation of why his or her bill is so high. In existing systems, the CSPs are typically unable to tell the subscriber what specific content-level data usage caused the resulting bill (e.g., the CSP cannot typically say "your viewing of YouTube videos caused the high data bill."). Because CSPs are often unable to prove the content associated with a subscriber's data usage, the CSP may have to credit subscribers' accounts, even when the subscribers have used the amount of data in question.

There are many other scenarios that can benefit from the techniques described herein. For example, in some embodiments, the techniques described herein can provide the following:

A breakdown of HTTP and HTTPS transactions on a network can be provided. This information is useful to CSPs for network forecasting, selecting network optimization tools (since the majority of these can typically only optimize unencrypted traffic), understanding application performance across HTTP and non HTTP traffic, etc. Since HTTPS information is typically not available in traditional deep packet inspection ("DPI") logs many CSPs don't have a resource for this information.

Specific device types can be attached to usage information so CSPs can understand device level usage as well as provide this device-level usage back to the device's Original Equipment Manufacturers (OEMs). Device type information can either be provided by the CSP (which typically maintains information about each subscribers registered device) or can be inferred based on information in the network traffic. This information can be included as part of an enriched record to, for example, show the fact that a user accessed certain content using an Apple iPhone. Apple (or other companies) may be interested in this information so that they can better understand how subscribers are utilizing their devices.

Enterprise and other similar users can receive a total breakdown of usage and/or content accessed. For example, companies that provide cell phones to their employees may want to understand how the employees are using their phones to decide whether it makes sense to continue that practice. On a more individual level, parents may want to monitor what children are doing on their phones. The system provides this information through the enriched records for the subscribers of interest.

Breaking down usage for websites and third parties across all protocols. As more websites extend their content outside of simple text and images (to include things like streaming audio/video, instant messaging, voice calls, etc.), they may leverage protocols other than HTTP that would be missed by traditional DPI. The system provides this information by mapping each transaction to a domain regardless of protocol used.

Understanding total usage for applications in connection with network planning and optimization. For example, if a CSP knows that consumers are likely to stream videos from YouTube in the evening, network resources can be allocated accordingly.

Getting usage information when DPI and HTTP records are unavailable. Flow records are typically easier to generate and more prevalent though harder to interpret. The system processes each flow record into an understandable interaction with a domain.

Determining the actual website being served to a subscriber when the content is being delivered via a content data network ("CDN") or cloud service. As more and more domains turn to third-party services to serve their content and/or to geographically distribute it, identifying the owner of the content becomes harder. Using associative mapping, the system provides the content owner of each transaction.

Providing the subscriber with their perceived usage when the actual service is analytics or advertising. Most subscribers do not realize that when they load a webpage it may load content from hundreds of other domains, often online advertising companies and/or analytics traffics. Using associative mapping, the system can associate traffic to "uninteresting" domains to the originating domain so that the subscriber can receive an intuitive understanding of how they used their service.

The foregoing scenarios are not intended to be limiting, and other benefits from the techniques described herein can be derived.

A CSP's ability to determine a subscriber's content level usage can depend on the protocol used to complete a transaction. For example, there are several protocols that can be used to complete transactions. HTTP is an example of one protocol, where transactions can be logged with IP Addresses and URLs (and other information such as user agent, content length, content type, response codes, referrer, etc.). These transactions are also typically known as clickstream data. HTTPS (SSL) is an example of another protocol that is more secure than HTTP. Typical DPI engines are not able to log HTTPS URLs since by definition the packet is encrypted and the information is not available in the clear. HTTPS transactions can be logged as flow records with IP Addresses and other information such as port numbers, transaction metrics, apps detected via DPI (e.g., Skype, WhatsApp, Facebook, YouTube) when URL information is not available. Protocols for email, such as IMAP/POP etc., can also be mapped similarly. While CSPs may be able to provide transaction records when transactions are logged with URLs, they are often unable to provide transaction records when that information is missing.

Embodiments of the disclosed subject matter can provide a platform for receiving corresponding IP address and port information along with metrics about the transaction after a user makes a request for a webpage or other Internet-based resource. This information can be used to infer a requested domain. In some embodiments, the platform can use multiple sources of information and contextual and associative analysis to infer the domain information.

FIG. 1 shows an exemplary process of inferring a requested domain. In this exemplary process one or more various techniques can be used to infer a domain requested by a subscriber. This can be useful to infer a requested domain when the URL associated with a transaction is unknown (e.g., when only an IP address is received). Note that while the present disclosure focuses on inferring domains, the same techniques can be used to infer other information such as the type of content that the subscriber is consuming (e.g., audio, video, browsing), the application being used (e.g., Skype, WhatsApp, Facebook, YouTube), the device being used (e.g., Apple iPhone, Samsung Galaxy), etc.

In some embodiments, the process 100 can begin by receiving a flow record. Flow records can be received from the CSPs, the CSPs' partners, and/or other sources. Flow records can include information such a subscriber id, source and destination IP addresses, source and destination port numbers, packet up information (e.g., number of packets sent to the CSP), packet down information (e.g., number of packets received from the CSP), bytes up information, bytes down information, start time/end time and/or duration, protocol information, network identity, identity and location of network equipment that the flow traveled on, among other things. This information can also be tied with other information (e.g., demographics, device information) to create a richer record. Typically, there is a flow record for each session that the user is involved in, although this is not required (e.g., flow records can be for set durations of time). Sessions are typically described as a sequence of packets using the same IP protocol (e.g., HTTP, DNS) between the same pair of endpoints (IP address and port number if used by the protocol). The start and end of a session can be delimited explicitly by the protocol being used (e.g., TCP syn, TCP fin), and/or by an idle timeout if there is no explicit protocol level indication (e.g., UDP).

The process 100 can use the flow record to try to infer a domain requested by the user using an in-stream lookup 102 (described more fully below) and/or contextual mapping 103 (described more fully below). Additionally, an associative mapping 104 can occur, which can be used to identify the real or perceived source domain of the content being served rather than the channel that actually served the content (e.g., distinguishing between a the actual content provider and a content data network that hosts the information). Typically, once the mapping process is complete, an enriched record is generated that includes the inferred information. The enriched record can be output, sent, and/or stored at step 105.

The in-stream lookup 102 can use techniques 106 and 107. Since techniques 106 and 107 are more successful in some situations and less in others (discussed more below), the in-stream lookup may use one, none, or both if it believes that that one of the techniques will be more successful than the other. The contextual mapping 103 can use techniques such as the use of an IP mapping database 108 and a user session history 109. The IP mapping database 108 can likewise be generated using techniques 112, 113, 114, and/or 115. Associative mapping 104 can be used to associate the domain serving the content with the real or perceived content owner. For example, with the advent of content delivery networks (CDNs) and cloud services, often times the domain that serves content is not actually the owner of the content (e.g., Amazon web services may provide streaming content on behalf of a sports network). In this example, it can be much more beneficial to know the name of the sports network, rather than the more generic Amazon web services. Further, there are classes of content (e.g., advertising and analytics providers) that are equally "uninteresting" because it is not descriptive enough of the actual content being accessed by the subscriber. In these cases, there can be a need to be able to identify these "uninteresting" domains to be able to attribute their usage to the original domain as the subscriber does not perceive usage going to these advertising and analytics domain but another website that loaded the advertising or analytics. Each are described in turn below.

In some embodiments, the in-stream lookup 102 techniques 106 and 107 can rely on real-time access to additional data sources that give information about the domain a user is trying to access. For example, these techniques can benefit from leveraging real-time access to information such as SSL handshake information and/or DNS lookup information. This information may be available via an in-line device capturing the records and provided by the CSP and/or a third party.

The technique 106 can involve looking at certificate information from secure socket layer ("SSL") transactions. For example, in some embodiments, the technique 106 can rely on information that is exposed during the certificate exchange process when accessing a secure webpage. In some embodiments, domain information can be obtained by observing the steps leading up to a secure HTTPS connection. For example, in SSL flows, packet inspection can observe the SSL negotiation. There are at least two ways the domain can be learned by observing information that is sent unencrypted:

1) The server name indication ("SNI") extension is typically used in most SSL client handshakes to tell the server for what domain the client is requesting a certificate, since a server hosting multiple domains can have many certificates available. Since the requested domain name is sent unencrypted, it is not necessary to use IP lookup to infer a domain (unless a more detailed server name could be learned by doing so). In other words, the domain accessed by the subscriber can be inferred by obtaining the unencrypted domain name sent by the client during the handshake process.

2) If SNI is not used, the certificate returned by the server during the handshake process can be examined. For example, there are at least three possibilities for inferring the domain requested by the subscriber:

a. The certificate can represent a single domain, in which case, this can be considered the requested domain.

b. The certificate can represent a wildcard domain (e.g. *.google.com), in which case the domain can be obtained by removing the star.

c. The certificate can contain multiple domains, in which case heuristics can be used to determine the most relevant (e.g. "news.company.com", "store.company.com", "api.company.com", www.company.com, www.company.co.uk). An example heuristic is to select the longest description (news.company.com in the example above); another example is to select the generic domain name (company.com in the examples above). Other heuristics can also be used, and can be adapted to the particular situation. For instance, the information returned from this can be combined with other publicly available information about the site or domain. For example, if a search indicates that news.company.com is owned by company A, then that information may be associated with the domain.

The technique 107 can involve examining domain name system ("DNS") records. For example, in some embodiments, the technique 107 can rely on DNS records, which typically expose the domain a subscriber was trying to reach. Since addressing on the Internet is done based on IP address, prior to most transactions a user typically needs to determine the IP address of a Domain using a service called DNS. Records of these DNS lookups can provide valuable information about the domain a user was trying to access in a particular Flow. Given a flow record for a subscriber to a particular IP address, a corresponding DNS lookup record that resolved a Domain to that IP address can provide the Domain that the user was trying to reach. In other words, if technique 106 knows the IP address that the user tried to access, this technique can examine DNS records to determine if this IP address was returned as a result of a DNS lookup for a particular domain.

Referring to the IP mapping database 108, this database of information can include inferred domain information, content types (e.g., audio, video, browsing, etc.), application signatures, device signatures, and others. The IP mapping database can be generated using several different techniques, including techniques 112, 113, 114, and 115. Each of the techniques are described in detail below. The information included in the IP mapping database can be generated by one or more of the techniques 112, 113, 114, and 115, depending on what the system is trying to infer about the transactions. For example, the techniques 112, 113, 114, and 115 can combine information on the requested IP address, port, and/or transaction metrics to help map a transaction to a domain. The technique 115 can leverage the transaction metrics to identify different content types (video is typically large volumes of data while browsing has much smaller volumes). The techniques 112, 113, 115, and 115 can be applied serially (in different orders) and/or in parallel.

The technique 112 can involve querying a "Whois" database (e.g., RFC 3912) as a first source of information for inferring a domain. For example, the IP address can be used generate a Whois request that can lead to a Whois Query Response. The Whois response can contain <IP Address, Port> mappings to domains that were learned through the use of whois processing. Whois can provide a good way to get descriptions of valid subnets, and a general idea of who owns them. In some embodiments, the system can parse a response and extract domains from email addresses using some heuristics. A sample heuristic is to pick one IP Address arbitrarily (first, last or some other criteria) from a list of IP Addresses included in the response. The system can then store the IP Address and the corresponding domain name mapping and include it as a data source in the mapping database.

The technique 113 can involve querying a reverse DNS response. In this technique, the second source of information can be a reverse DNS lookup. It can contain <IP Address, Port> mappings to Domains that were learned through the use of reverse DNS processing. DNS pointer (PTR) records (e.g., a reverse DNS lookup) can be a good way to get domains for specific IP addresses. One approach is to learn the IP Address to domain mappings for the frequently accessed IP Addresses in the transactions. The domain returned in a reverse DNS response can fall into one of a number of classes: a) a domain which is a known content provider, e.g. "cnn.com" in which an association can immediately be made between that IP and that content provider, b) a domain which is a known content delivery network, cloud service, hosting service, or internet service provider which delivers content on behalf of third parties, e.g. "akamai.net", in which case another technique must be used to determine the ultimate content provider (technique 104), or c) a domain which is unrecognized and must be flagged for subsequent manual investigation. The system can parse the DNS PTR records and use heuristics to filter the information. A sample heuristic can be to discard domains that are not useful to the analysis. For example, the system can discard internet service provider names. The system can retain the more specific domain names. The system can then store the IP Address and the corresponding domain name and include it as a data source in the mapping database.

The technique 114 can involve querying an SSL certificate (e.g., the system can try to set up its own secure connection with the IP address to glean domain information rather than "listening" to other SSL connection attempts). SSL Certificates can contain <IP Address, Port> mappings to Domains based on observed SSL certificate exchanges. SSL certificates can provide valuable information about the domain(s) available on a particular IP address. By initiating a SSL connection to an IP address, and processing the returned certificate, the system can glean much of the same information as described for technique 106. The technique 106, however, involves watching the SSL exchange as third parties initiate the SSL connection and obtain the server certificate and typically requires in-line hardware to sniff the packet exchange. The technique 114 can be more flexible because it typically involves initiating an SSL connection to the server directly and observing the certificate that is returned. The technique 114 typically requires no additional in-line hardware and can return useful information for servers that host a single certificate. In cases where this information is returned, the system can store the corresponding domain name and include it as a data source in the mapping database.

The technique 115 can involve querying clickstream IP information and can be another way the system gets domain information for specific IP addresses. Clickstream typically refers to the logs of transactions that are created when web pages are accessed using the HTTP protocol. Clickstream IP information that includes subscriber, domain, and IP address, and HTTP transaction metrics (e.g., data consumed, number of HTTP events, round trip time, etc.) can be provided by the CSP from either standard DPI logs and/or DNS lookup records. This approach typically involves using samples of clickstream data off-line to build up an IP mapping database (e.g., the database 108). The IP mapping database can then be used in real-time for mapping flow data. This technique can be quite powerful since it typically works in two scenarios: (a) clickstream data is available from the CSP where the system is trying to also reverse map flow traffic, and (b) clickstream data is not available from the CSP where the system is trying to reverse map flow traffic. In this second scenario, clickstream traffic from any subset of CSPs can be used to build a database that can then be used in other CSPs. Note that since IP mappings change frequently, this database can be continuously built and updated, as described in the learning methodology in FIG. 5.

Clickstream IP information can be useful in two ways. First, it can be used in isolation to provide valuable insight into mapping a transaction to a domain. Specifically, a mapping table of domains and their corresponding IP addresses can be built. Second, it can also be combined with flow records to populate an <IP Address, Port, Transaction Metrics> to Domain mapping based on its contents. In other words, by combining clickstream transactions with flow records, the system can identify the domain for a given <IP Address, Port, Transaction Metrics> mapping.

To combine these records, the system can synchronize the subscriber and timestamp portions of the record across both datasets. For example, if the clickstream records show a subscriber visiting Facebook at IP address 1.2.3.4 at noon and the system has flow records for the same subscriber at noon, the system can label those flow records as examples of Facebook flow records. Since the system typically has a lot of data across multiple subscribers, the system can generally drop records that it couldn't combine un-ambiguously. This can happen when a subscriber visits two separate domains that are being served from the same IP address at roughly the same time. Once combined (e.g., by matching the subscriber, IP address, and timestamp across both record sets), the system can include this information as a data source in the mapping database.

In the case where multiple domains are being run on the same IP address and port, the system can leverage additional transaction metrics to further differentiate the domains. For example, on the same IP address and port, the system may have a domain streaming video and another serving advertising. By looking at the differences in the metrics associated with the transactions to each domain (e.g., bytes up, bytes down, packets up, packets down), the database can better identify the correct domain. In the foregoing example, transactions containing fewer bytes are more likely to belong to the advertising domain while those containing more bytes are more likely to belong to the streaming video domain. Note that while this approach describes knowing clickstream data to infer flow domains, only samples of clickstream and flow information are typically required to build a database. The real-time mapping of IP addresses to domains doesn't require knowing the complete flow traffic with associated timestamps.

Figure 3:
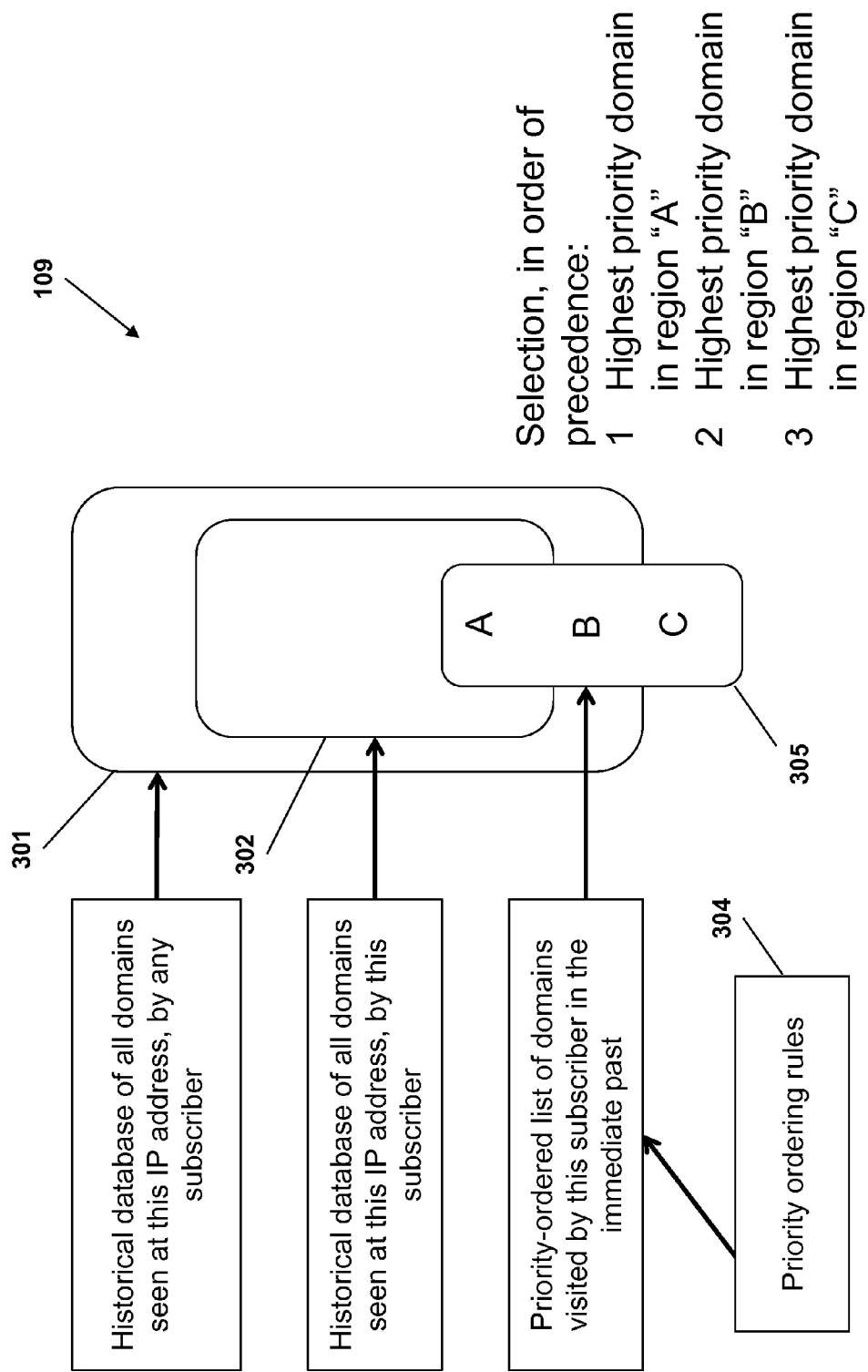
FIG. 3 illustrates examples of inferring a domain name based on a history of transactions for a user.

The technique 109 is described next. This technique typically uses a user transaction and/or session history to refine IP mappings. FIG. 3 shows how the system described herein can maintain a transaction history for all users and use an analysis of this information to infer the appropriate domain name. This transaction history can be stored in two separate ways. The first is a historical record of the domains seen at each IP address and the second is a historical record of the domains visited by each subscriber. The sizes of both transaction histories can be configurable (e.g., in time, number of transactions, and/or other metrics).

The historical record of the domains seen at each IP address can be available at multiple granularities. A more general granularity is shown in the outer bubble 301 and is the historical database for all domains seen at this IP address by any user. This set corresponds to all the domains the system has ever assigned to transactions to a particular IP address and can come from previously created enriched records 105. Since most domains don't typically change IP addresses frequently, this can provide a good data source of the candidate domains running on each IP address. A more specific granularity is shown in the inner bubble 302 and is the historical database of all domains seen at this IP address by a particular subscriber. Again, this information can come from previously created enriched records 105 and can correspond to the set of all the domains the system has ever assigned to transactions involving the particular subscriber and IP address. Though a single IP address can serve content from multiple domains, most subscribers do not visit the same IP address for more than one domain so this set provides a good data source of candidate domains that a particular subscriber is probably accessing on this IP address. Note that these different sets have different strengths and weaknesses. For example, bubble 301 shows all the domains the system has ever seen on a particular IP address. As such, the correct domain is likely in this list but so are many incorrect domains. The bubble 302 is very specific to a single subscriber's activity. As such, it can be very helpful when the system has seen a subscriber doing something before but if this is the subscriber's first transaction, this typically won't have any useful information.

The second part of the transaction history can be a historical record of the domains recently visited by each subscriber. The per-subscriber historical domain record is shown in bubble 305 and can provide a priority ordered list of domains visited by each subscriber. This information can be useful since subscribers typically visit a relatively small number of domains so it is likely that the domain that they are currently visiting is one that they have recently visited. As before, this information can come from previously created enriched records 105. The ordering of the recently visited domains can be determined by the priority ordering rules 304. Many different ordering rules are possible. In one embodiment, the system can order the domains according to time of last access. That is, the system can favor more recently accessed domains over ones accessed in the past. Alternatively, in another embodiment, the system can favor more "interesting" domains (e.g., those that are not CDNs, advertising, or analytical domains). Other ordering rules are possible.

Below is an exemplary algorithm of how these sources of data can be used to infer/decide the domain that a subscriber currently trying to reach. Note that there are other algorithms to combine this information. For example:

1. If a subscriber is visiting an IP address they've previously visited (302) and there are domains on that IP address that they've recently visited (305), then use the overlapping (region A) domains as the candidate set.
2. If the candidate set from 1 is empty, then use the overlapping set of domains that all subscribers have visited on this IP address (301) and the set of domains that the subscriber has recently visited (305) as the candidate set (region B).
3. If there is candidate set from 1 and 2 are empty, then use the set of domains that the subscriber has recently visited (305) as the candidate set (region C).

In cases where the candidate set consists of more than a single domain, the list can first be further filtered using some heuristics. The system can filter the list based on, for example, the system's rules governing inclusion, exclusion, and/or prioritization to reduce it down to a single domain that can be called the inferred domain name. In some embodiments, this filtering can be done according to the priority ordering rules 304 and simply taking the highest priority domains. As another example, the system can prioritize the resolution to a game site if the user profile tells the system that he/she usually visits game domains.

The technique 104 is described next. The other techniques defined earlier can map IP addresses to corresponding domains based on a number of techniques. Even with these techniques, however, it is likely that some IP addresses will still get mapped as a CDN (e.g. Akamai) or a cloud service (e.g. Amazon Web Services). These are services that deliver the content, but the user is not aware of this. For example, a subscriber may think that he or she is accessing an ESPN server, but is actually receiving ESPN content from a server operated by Akami. It can thus be desirable to map these IP addresses to their corresponding user-perceived domains.

In this case, the use of the contextual mapping process 109 can be used to prioritize mappings to the last known "visited" domain the subscriber has accessed and attribute the relevant usage to that domain. For instance, the list of IP addresses may indicate CDNs, whereas in the history of that subscriber, it is possible to have seen one access to "netflix.com." In this case, it may be inferred that the user accessed Netflix.com, but then the actual content delivery happened over the Akamai CDN and all the traffic for the Akamai detected IP addresses for this subscriber can then be attributed to Netflix.

Similarly, with the advent of cloud services that host multiple services, it is likely that an IP may get mapped to Amazon Web Services or such a cloud service. By observing the history of that user's transactions going to a specific site, it can be possible to attribute all the Amazon Web Services IPs to the actual service. Another scenario of attribution is one when the IP address resolves to an advertising network (e.g., doubleclick.com) or analytics tracker (e.g. comscore.com). These are legitimate domains, however they may not be perceived as such by a user as a visited domain. For some scenarios it may be required to identify these as the actual site while for some scenarios it may be desired to associate this traffic to the user perceived activity. So, in a sequence of activity to cnn.com, if access to doubleclick.com is seen, then the access to doubleclick.com can be associated with the cnn.com traffic. Thus, the techniques described herein can allow configurable mapping and correct attribution of such traffic.

Figure 2:
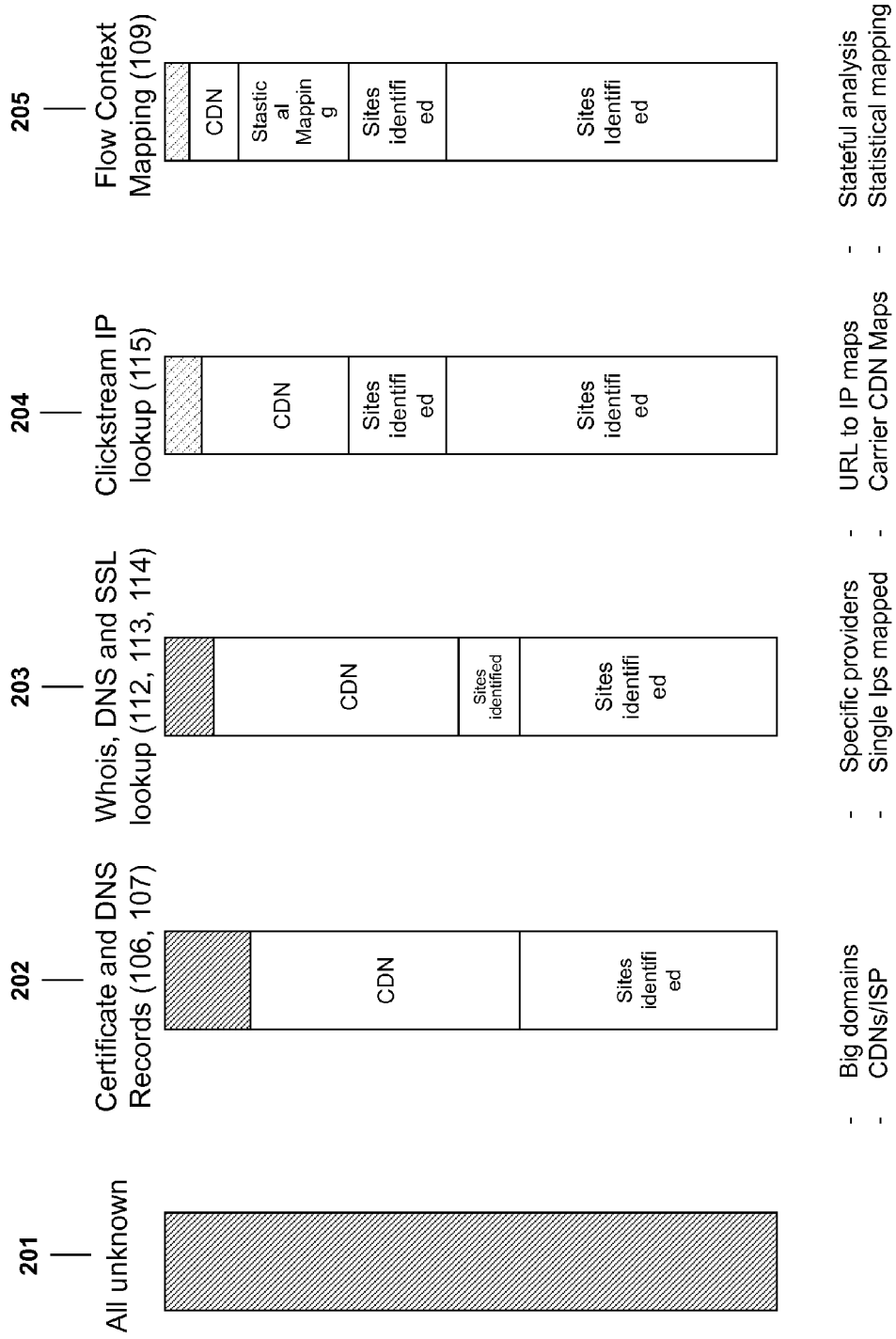
FIG. 2 shows the advantage of using multiple techniques to infer a requested domain.

FIG. 2 shows examples of employing multiple techniques described in FIG. 1. The figure shows an example of how unknown mappings can be reduced at each step with the use of multiple techniques. On the far left of the FIG. (e.g., 201), the system does not have any information about the domains for any of the records. By leveraging techniques 106 and 107, when possible, the system is able to identify some of the domains (e.g., 202). The domains identified by these techniques tend to be the larger domains that usually have either their own IP address or run on CDNs. By leveraging 112, 113, and 114, the system can identify additional domains. These domains tend to be either specific providers or domains that run on a single domain (e.g., 203). The clickstream IP information 115 can further improve the number of domains detected by identifying specific carrier CDN maps and URLs that map to specific domains (e.g., 204). Lastly, techniques 109 and 104 can be used to identify unknown domains based on the domains the subscriber recently visited and to identify the true content domain instead of a CDN or other cloud provider, respectively (e.g., 205).

While the different techniques described in FIG. 1 can be applied in different orders, the sequence shown in FIG. 1 has been found to be preferred in terms of the quality of results and implementation performance. Specifically, starting with the input data 101, the steps to be applied are preferably 102 (comprising of 106 and 107), followed by 103 (comprising of 108 and 109), followed by 104, leading to the output 105. The preferred sequence for building the database 108 is as shown in steps 112, 113, 114, and 115 in that preferred order. FIG. 2 substantiates this by showing how the accuracy of the results can improve as different techniques are applied in the order as described. This particular order is not required, and other orders can be used.

Figure 4:
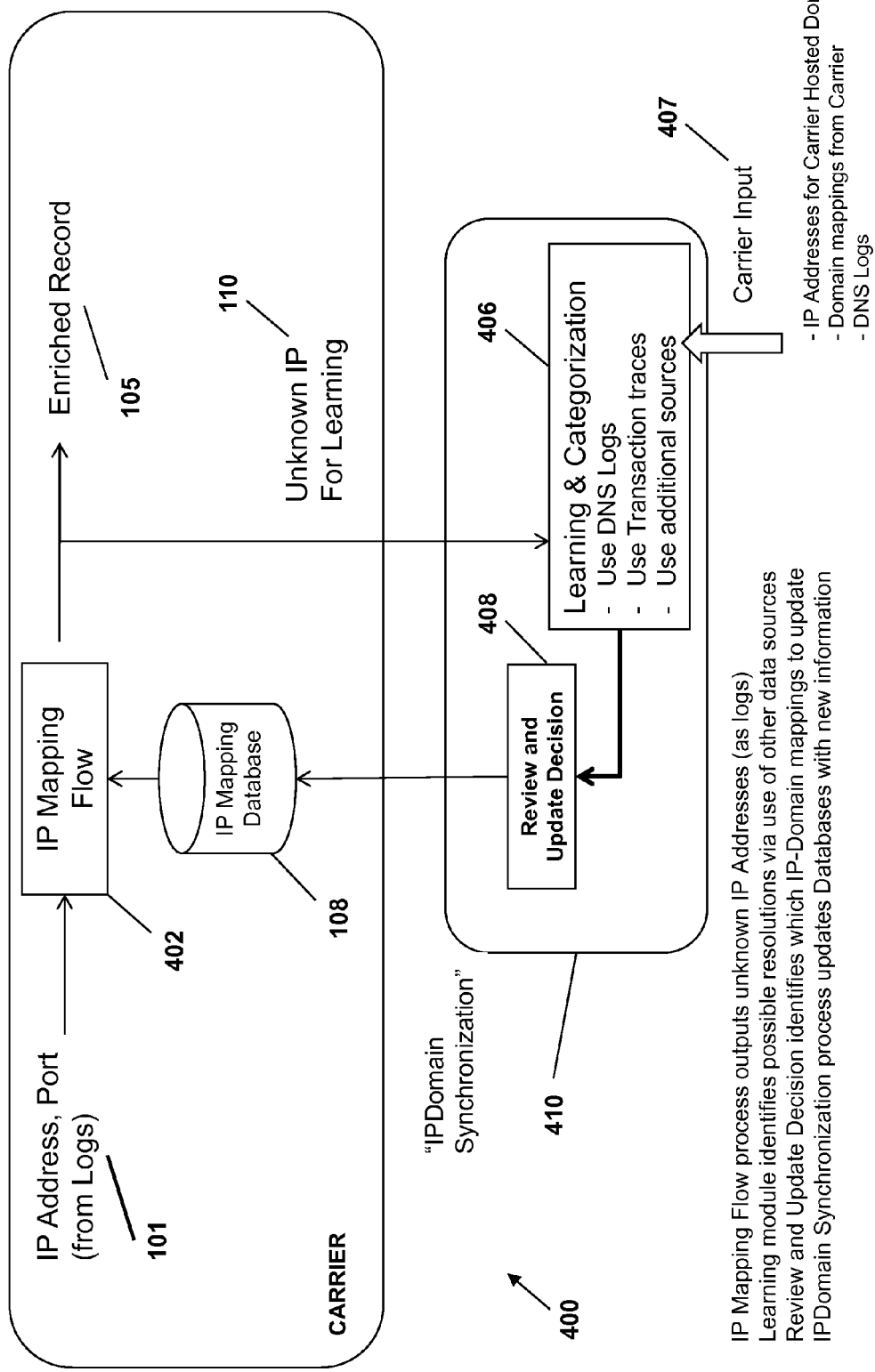
FIG. 4 illustrates a process of updating the mapping database.

Referring to FIGS. 1 and 4, an exemplary learning process that is generally related to updating the IP mapping database 108 is shown. This can include (a) updating domain mappings for existing IP addresses, since they tend to change over time and (b) learning mappings for new IP addresses that are seen in incoming flow traffic. An exemplary overall learning process can involve:

identifying unknown IP addresses seen in the flow traffic;
    using one of several techniques to find their mapping domains;
    inserting those newly learnt mappings into the IP mapping database;
    applying the newly learnt database for subsequent mappings.

In some embodiments, the system can periodically (e.g., at a fixed interval, when significant new information becomes available and/or when the volume of unknown data exceeds a threshold) update the IP mapping database 108 and ensure that the real-time mapping of <IP Address, Port, Transaction Metrics> to domain names succeeds with a high degree of confidence. In systems that are able to combine clickstream information with flow records, the system can quantify accuracy by comparing the domain inferences made by the system to the true domain in the matched records. Other techniques such as accessing known traffic and comparing mapped data can also be used to further quantify the accuracy of the mapping.

In some embodiments, the process 400 begins at the CSP by receiving IP address and port information from the logs 101, which are described more fully above. The IP address and port information can be generated by a subscriber trying to access a webpage and/or other Internet based resource.

In some embodiments, the next step can involve the IP address mapping flow 402 (e.g., the process described above with respect to FIG. 1). If the IP address is known, then the known IP address can be mapped and provided as an enriched record 105. An IP address can be considered "known" when the system is able to successfully assign a domain to the <IP Address, Port, Transaction Metrics>. When the system is unable to do that, the unknown transaction 110 can be sent to an IP domain synchronization system 410 that can help the system determine which IP addresses it is not able to map accurately. Depending on the rules enforced by the CSP to maintain the security of their network, the synchronization system 410 can be operated by the CSP and/or other party.

Given the list IP addresses the system was not able to map accurately, the system can go through a learning and categorization process 406 that attempts to learn new mappings using the following techniques:

1. In some embodiments, DNS queries and response logs are obtained by deep packet inspection. In this case, the CSP may configure their DPI system to inspect DNS transactions and log information about every DNS lookup request (the domain the subscriber looked up) and DNS response (the IP address the lookup was resolved to). The system can use these logs to identify the IP address returned for a particular Domain name. By analyzing these logs the system can identify mappings for IP Addresses that the system does not have a resolution for. The system can then add this mapping into a mapping database for future use.

2. In some embodiments, using components that are part of (but not necessarily owned or operated by) the CSP network, the system can capture the network traffic (e.g., websites visited, network traffic by popular applications). For example, a device on the CSP network may be used to perform a fixed set of tasks in a way that what the device actually did is known (e.g., the device logged into Facebook, used the YouTube application). This can give the system a trace of domain name resolutions from actual traffic on the CSP network. By cross checking these IP address to domain mappings with entries in the IP mapping database 108, the system can identify mistakes and update as required.

3. In some cases, the IP domain synchronization system 410 can visit the website using the IP address to glean information. For example, the system can visit the webpage associated with the IP address in a subscriber's request and identify that it is a news site or a video distribution site. The mapping database can be updated based on the information learned from visiting the IP address.

4. In some embodiments, the system can receive information about the network from operators and use that to identify candidate Domains and <IP Address, Port> mappings (e.g., carrier input 407). For instance, if the carrier is hosting a service on specific servers, the carrier can provide the domain of the service as well as corresponding IP addresses of the server. Similarly, the system can receive information from other sources about network deployments. The system can also analyze the information and identify candidates for inclusion.

5. In some embodiments, the system can leverage clickstream data to obtain DNS like records that show the domain a subscriber was trying to access and the IP address that they accessed the content from. Additionally, the system can leverage the HTTP transaction metrics to differentiate domains on the same IP address (e.g., as described above).

6. In some embodiments, the system can use clickstream data to build a map of IP addresses and their corresponding domains.

7. In some embodiments, the system can use information from other sources such as CDN logs, or SSL certificate hosting information to capture additional information.

8. In some embodiments, the system can match information from flow records with clickstream data or DNS query response logs to obtain historical Transaction Metrics to each domain on a particular <IP Address, Port>. The system can leverage these transaction metrics (for any protocol, not just HTTP as in 5) to differentiate domains on the same IP address.

Once the system has a candidate set of improvements from the methods above, it can decide which IP domain mappings should be updated 408. As an example, if every method returns the same domain for a particular IP address, the system can safely choose to update the mapping information for that IP address. In cases where there are domain conflicts or incomplete information from one of the methods, the system typically needs to decide if it should update the mapping (knowing that it may lead to possible errors) or wait until it has more information to make a more confident mapping. As another example, the system can update only the most impactful entries as measured by frequency of access, amount of traffic (in bytes), etc.

Once the system decides which information to update, the IP mapping database 108 can be updated to reflect the latest information. When any of the data sources is to be updated, the IP domain synchronization system 410 can introduce the newer version at regular intervals and then the procedure for looking up domains for a given IP address can benefit from the latest learned information. In some embodiments, the updating process can include the following:

1. The system can identify candidates for checking by using one or more criteria. Examples can include one or more of the following:

a. Sites accessed beyond a configurable threshold of number of times accessed over a configurable period of time can be validated.

b. Sites with traffic sent or received beyond a configurable threshold of number of bytes sent/received over a configurable period of time can be validated.

c. Crossing a configurable threshold of time elapsed since last check can cause the system to validate a site.

2. For each identified candidate, the system can repeat part or all of the techniques described herein to identify the domain for the <IP Address, Port> mapping.

3. If the domain name needs to be updated for a particular <IP Address, Port, Transaction Metrics>, the system can replace the existing entry in the mapping database.

While the above describes a particular order of operations performed by a given embodiment, it should be understood that such order is exemplary, as alternative embodiments may perform the operations in a different order, combine certain operations, overlap certain operations, or the like. References in the specification to a given embodiment indicate that the embodiment described can include a particular feature, structure, or characteristic, but every embodiment may not necessarily include the particular feature, structure, or characteristic.

Figure 5:
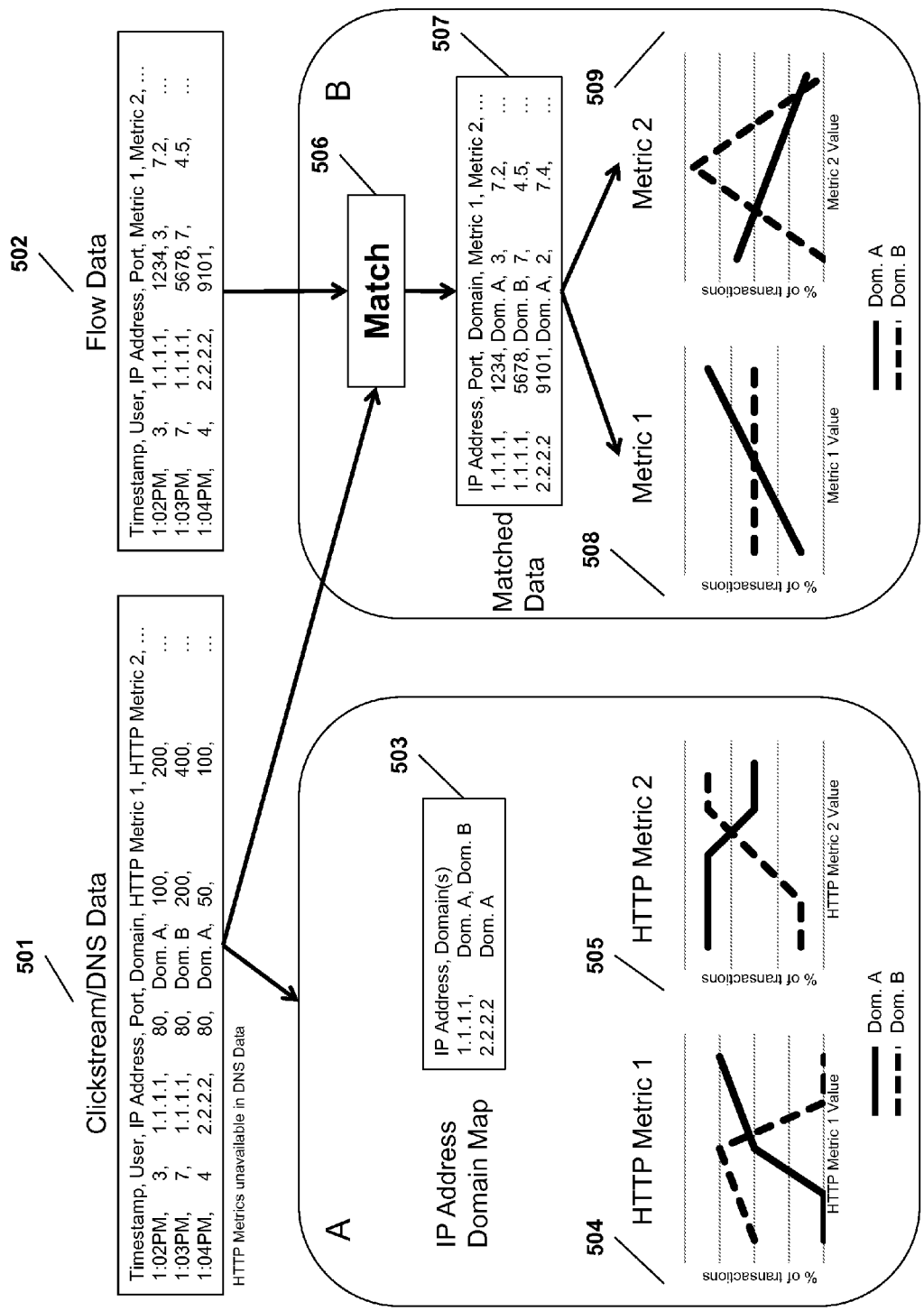
FIG. 5 illustrates a process of leveraging clickstream data to learn IP addresses to domain mappings.

FIG. 5 shows two exemplary ways to leverage clickstream and/or DNS records to build the IP mapping database 108. Panel A shows how the system can use clickstream data in isolation to produce accurate domain mappings of IP addresses and HTTP transaction metrics. Panel B shows how the system can match clickstream and/or DNS records with flow records to produce a historical set of Transaction Metrics (across all protocols, not just HTTP) of what traffic to a Domain "looks like."

In isolation (Panel A), clickstream and/or DNS records 501 that show the domains a subscriber was accessing at each time can provide two valuable pieces of information for the IP mapping database 108. First, since clickstream and DNS records can provide both the domain a subscriber was trying to access as well as the IP address that provided the content, it can provide a historical dataset of which domains are being served on which IP address 503. This information is a different way to get the same information as techniques 107 and 113. Second, in the case of clickstream data, metrics (e.g., data consumed, number of HTTP events, round trip time) about the HTTP transactions to each domain are available (DNS records do not contain any such information). By building a history of this information, the system can build an expectation about what HTTP transactions to each domain "look like" (504 and 505). This history can help to differentiate two domains that use the same IP address to serve content. As an example, consider the data in 504 and 505. If a new flow record for an HTTP transaction to IP address 1.1.1.1 comes into the system, there are at least two domains the system should consider: Domain A and Domain B. By looking at the metrics associated with the HTTP transaction, the system may be able to differentiate the domains. If the HTTP Metric 1 value is high (to the right on 504) and the HTTP Metric 2 value is low (to the left on 505), then the system can be more inclined to select the Domain A (shown in solid line) since that is more consistent with what HTTP transactions typically "look like" on Domain A than on Domain B.

Panel B shows how clickstream and/or DNS records can be matched with flow records to produce an expectation of what traffic to a domain "looks like" across all protocols (not just HTTP). This information can be used to differentiate multiple domains on the same IP address, independent of the protocol used. Given clickstream or DNS records that show the domains that a subscriber was accessing at each time 501 and the associated flow data for the same subscribers at that same time 502, the system can produce unambiguously matched data by looking for subscribers who only ever visited a single domain at a single IP address. Given the large volumes of subscribers and data that most CSPs have, the system can generally drop data that could not be unambiguously matched. The net result of this process can be a set of matched data 507 that preferably contains all the data provided in the original flow record and a label that shows the true domain a subscriber was trying to reach. With this historical set of transaction metrics for each domain on the <IP Address, Port>, the system can build a statistical model of what traffic to the domain should "look like" and store that information in a database for real time lookup. As an example, consider the data in 508 and 509. If a new flow record for a transaction to IP address 1.1.1.1 comes into the system, there are at least two domains that the system should consider: Domain A and Domain B. By looking at the transaction metrics associated with the transaction, the system may be able to differentiate the domains. If the Metric 1 value is low (to the left on 508) and the Metric 2 value is average (the middle on 509), then the system will be more inclined to select the Dom. B (in brown) since that is more consistent with what transactions typically "look like" on Dom. B than on Dom. A.

While given components of the system have been described separately, one of ordinary skill also will appreciate that some of the functions may be combined or shared in given instructions, program sequences, code portions, and the like.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

The description herein describes network elements, computers, and/or components of a system and method for providing a bundled product and/or service along with an insurance policy that can include one or more modules. As used herein, the term "module" refers to computing software, firmware, hardware, and/or various combinations thereof. At a minimum, however, Modules, are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another.

Additionally, the modules can be moved from one device and added to another device, and/or can be included in both devices. To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

What is claimed is:

1. A computerized method for inferring a domain for an IP address, the method performed using at least one processor, the method comprising:

receiving, by the at least one processor, a computerized flow record from a communication service provider including the IP address, wherein the IP address corresponds to a request from a subscriber for an Internet resource;

performing, by the at least one processor, an in-stream lookup comprising:
 determining, by the at least one processor, whether any secure socket layer ("SSL") exchanges result from the request for the Internet resource;
 when the SSL exchanges exist, attempting to retrieve domain information corresponding to the IP address from the SSL exchanges;
 determining, by the at least one processor, whether any domain name system ("DNS") records exist that include the IP address; and
 when the DNS records exist that include the IP address, attempting to retrieve the domain information corresponding to the IP address from the DNS records;

performing, by the at least one processor, contextual mapping comprising:
 performing a whois query using the IP address in an attempt to identify the domain information corresponding to the IP address;
 performing a reverse DNS lookup in an attempt to identify the domain information corresponding to the IP address;
 attempting to establish an SSL connection to the IP address to identify the domain information; and
 querying clickstream information from the content service provider in an attempt to identify the domain information; and performing, by the at least one processor, a learning process to populate a database used while performing contextual mapping, the learning process comprising at least one of:
 performing deep packet inspection to obtain DNS queries and response logs;
 capturing network traffic within a network to trace domain resolutions within the network;
 attempting to access a webpage associated with the IP address; and
 analyzing clickstream data.

2. The computerized method of claim 1 wherein the Internet resource is a webpage.

3. The computerized method of claim 1 wherein performing contextual mapping further includes analyzing a user transaction history in an attempt to identify the domain information.

4. The computerized method of claim 3, wherein the user transaction history includes at least one of:
 a historical record of all domains associated with the IP address, regardless of the user that requested the IP address; and
 a historical record of all domains associated with the IP address in response to a request for the IP address from the subscriber.

5. The computerized method of claim 1 wherein querying the clickstream information further includes querying a database of clickstream information.

6. The computerized method of claim 4 wherein the method further comprises building the database of clickstream information by analyzing deep packet inspection ("DPI") logs and domain name system ("DNS") lookup records.

7. The computerized method of claim 1 further comprising performing, by the at least one processor when the domain information was successfully retrieved, associative mapping comprising:
 determining, by the at least one processor, whether the domain information corresponds to a user-perceived domain; and
 when the domain information is not a user-perceived domain, determining a corresponding domain that is a user-perceived domain.

8. The computerized method of claim 1 further comprising updating the database, the updating comprising:
 using DNS queries and response logs obtained during the contextual mapping process to update the database;
 using domain resolutions traced during the contextual mapping process to update the database;
 using web pages accessed during the contextual mapping process to update the database; and
 using clickstream data analyzed during the contextual mapping process to update the database.

9. The computerized method of claim 1 further comprising generating an enriched record including the IP address and the domain information.

10. The computerized method of claim 1 further comprising determining an application that the subscriber used to request the Internet resource.

* * * * *